United States Patent
Wiener

[11] Patent Number: 6,056,904
[45] Date of Patent: May 2, 2000

[54] CULTURED STONE METHODS OF MANUFACTURE

[75] Inventor: Kenneth Wiener, Rancho Palos Verdes, Calif.

[73] Assignee: American Stone Pioneers, Rancho Palos Verdes, Calif.

[21] Appl. No.: 09/022,519

[22] Filed: Feb. 12, 1998

[51] Int. Cl.[7] .................................................. B29C 39/12
[52] U.S. Cl. ............................. 264/77; 264/73; 264/245; 264/333; 501/127; 524/430; 524/437
[58] Field of Search ............................. 264/77, 333, 245, 264/73, 122; 501/127; 524/430, 437

[56] References Cited

U.S. PATENT DOCUMENTS

| | | | |
|---|---|---|---|
| 3,814,790 | 6/1974 | Kato et al. ............................. | 264/122 |
| 4,433,070 | 2/1984 | Ross et al. ............................. | 523/171 |
| 5,286,290 | 2/1994 | Risley ..................................... | 106/401 |
| 5,304,592 | 4/1994 | Ghahary ................................. | 524/437 |

*Primary Examiner*—Mathieu D. Vargot
*Assistant Examiner*—Suzanne E. Mason
*Attorney, Agent, or Firm*—Small Larkin, LLP

[57] ABSTRACT

An improved, method of making a lightweight synthetic stone product mixing a white powdery mixture comprising approximately 20–90 parts by volume of $Al_2O_3 \cdot 3H_2O$ and about 10–80 parts by volume polyolefin, preferably a polyethylene such as LLPE, HDPE and Super Linear PE and polypropylene in a ratio of 30–60% by volume with a clear thermosetting resin in a ratio of about 40–70% by volume and a peroxide catalyst in about 0.1–5.0% by volume, and a pigment, if desired, with the clear thermosetting resin selected from the group of unsaturated polyesters, acrylic-modified polyesters and acrylics.

21 Claims, No Drawings

CULTURED STONE METHODS OF MANUFACTURE

BACKGROUND OF THE INVENTION

A. Field of the Invention

The present invention is directed to lightweight synthetic stone products such as cultured onyx and solid surface used for sinks, bathtubs, counter tops, shower pans, wall panels and other related products and parts.

B. Description of the Prior Art

Cultured onyx is a well known synthetic stone product. Cultured onyx is generally made with a high purity, aluminum trihydrate (ATH), having the chemical formula $Al_2O_3 \cdot 3H_2O$. ATH has a specific gravity of 2.4. Cultured onyx products are made with a low color, clear, unsaturated ortho polyester resin and a peroxide-containing catalyst such as a commercially available methyl ethyl ketone peroxide (MEKP) product.

In the United States, polyester resins are commercially available from Interplastic corporation's Silmar Resins, Reichhold Chemicals, Ashland Chemicals, Cook Composite Products, Inc., and McWhorter, Inc. MEKP is commercially available from the Norac Company, Inc.; Witco Corporation; and Akzo.

Conventional cultured onyx is made by mixing the ATH with the unsaturated ortho-polyester resin and the catalyst, placing the mix into a mold and permitting the polymerization reaction to proceed until such time as the casting is hard enough to remove from the mold.

Cultured onyx differs from other synthetic stone products, such as cultured marble, in the high degree of translucency exhibited by cultured onyx. The refractive index of the ATH component matches well with that of the resin, with the opacity due to the small amounts of pigment added to achieve the stone-like veining patterns typical for onyx. The high purity and clarity of the ATH insures that the background color is as neutral as possible, thereby allowing manufacturers to modify their products to please as many customers as possible.

Other synthetic stone products, such as cultured marble, have been made using lightweight, hollow fillers. However, cultured onyx, unlike other synthetic stone products such as cultured marble, have not heretofore been made with lightweight, hollow filler materials due to the low color, high translucency requirements of cultured onyx. Known hollow filler particles, whether white, i.e., low color, or of other colors, have multiple interfaces for reflection and refraction, and these multiple interfaces function to increase opacity. Additionally, the air contained within the particles increases the opacity by ensuring that the inside surfaces do not "wet out", that is, cover the surface with a liquid. Because these inside surfaces do not wet out, the differential refractive index between the inside and outside surface is relatively high. The differential refractive index between two surfaces defines opacity, e.g., high differential refractive indices indicates a high degree of opacity.

Cultured marble is also a well known synthetic stone product. Cultured marble is made with calcium carbonate ($CaCO_3$). In the United States, many manufacturers of cultured marble also manufacture cultured onyx. It is believed that approximately one-third of these manufacturers use lightweight fillers as a substitute for part of the $CaCO_3$ component in their cultured marble production. However, it is believed that no successful lightweight filler material has been found to function as a replacement for any part of the ATH component of cultured onyx.

As is also well known, manufacturers of cultured marble and cultured onyx use molds to shape their products. Typically, in a 10–30 mil thick layer of gel coat, unfilled iso-Neo Pentyl Glycol polyester resin catalyzed with MEKP, is applied to a mold, usually by spraying before the resin is placed into the mold. In recent years, with popularity of products such as DuPont's Corian® for counter tops and sinks, and with the development of advanced, acrylic-modified polyester resins, many cultured marble manufacturers have begun to produce parts without the protective gel coat. Such castings are extremely stain resistant, and are referred to as "solid surface" materials. Solid surface materials are also produced in a wide variety of colors and visual effects.

Conventional cultured onyx has a weight of approximately 6.5 lbs. for a 1' square, ¾" thick sample. In contrast, a sample of cultured marble, 1' square×¾" thick, typically weighs approximately 8 lbs. The primary difference between the weight of conventional cultured onyx and conventional cultured marble is due to the low specific gravity of the ATH compared to the specific gravity of calcium carbonate, and the higher percent of resin typically used in a cultured onyx product. Even though conventional cultured onyx is lighter than conventional marble, a need exists for cultured onyx having a lighter weight than the conventional cultured onyx.

Previous attempts to produce lightweight cultured onyx by substituting other materials for all or part of the ATH component have failed for various physical or chemical reasons. For example, it is known that portions of the ATH component have been substituted with salts, such as sodium silicate or sodium chloride, corn starch or with reground polycarbonate. However, when a salt was substituted for ATH, the casting blistered in use, due to the dissolution of the salt particles. Also, the castings swelled, cracked and then turned opaque when corn starch was substituted for ATH. In the case of use of reground polycarbonate used as a substitution for the ATH component, a high lead content was detected as leaching into the water.

OBJECTS AND SUMMARY OF THE INVENTION

It is an object of the present invention to provide a longer lasting, durable, lighter weight, translucent, cast object used in bathroom or decorative applications, and as commonly referred to as cultured onyx or solid surface.

It is a further object of the present invention to provide a filler for use in a non-pigmented thermoplastic material with a refractive index similar to that of thermoset resins commonly used to produce translucent parts, the thermoplastic material preferably comprising a polyolefin such as polyethylene and polypropylene.

It is a further object of the present invention to provide cultured onyx products and solid surface having improved thermal shock performance.

It is a further object of the present invention to provide a thermoplastic filler material for use in cultured onyx products and without restriction on particle size or shape of the thermoplastic component.

It is a further object of the present invention to establish an optimum ratio of ATH and thermoplastic filler material for use in cultured onyx components.

It is a further object of the present invention to provide for cultured onyx using thermoplastic resin material as a lightweight filler component and to be used as castings for cultured stone products.

With reference to the above-described object, the present invention provides an improved cultured stone product commonly referred to as cultured onyx, in which the conventional ATH component is substituted, in part, with a shredded, clear thermoplastic resin which functions as a lightweight filler material. The shredded thermoplastic materials are those which are commonly used for rotationally molded parts such as trash cans. The thermoplastics envisioned for use in the present invention are polyolefins, primarily polyethylene (PE) and polypropylene (PP). Also, it is envisioned that polymethylpentene and other polyolefins having similar weight and optical properties may be used.

DESCRIPTION OF THE PREFERRED EMBODIMENTS

The present invention relates to a partial substitute for ATH requirement in cultured stone castings. The substitute may be blended with ATH to be sold as a single package, and the mixture may be polymerized to form cultured stone castings.

The present invention may be utilized to produce lightweight translucent parts, having improved thermal cycling properties and good stain resistance. With respect to the thermal cycling properties, it has been demonstrated that castings of the present invention are able to withstand up to ten times the thermal cycling capability of the conventional cultured stone products.

As is also well known, lightweight fillers have been used in the cultured marble field to reduce the density of finished parts and to improve thermal shock properties of the resulting products. For example, reduced density of the finished products facilitates easier handling, faster installation and reduced shipping costs in certain circumstances. Also, for example, improved thermal shock properties result in the products having an increase of hot/cold cycles that the product will survive. In the context of the cultured marble field, lightweight cultured marble products have been shown to have an eight-fold increase in ability to survive hot/cold cycles compared to the conventional, ordinary weight cultured marble products.

Pure, lightweight fillers commercially available and currently used to make cultured marble are small, spherical particles which are hollow and commonly known as "microspheres". These microspheres typically have an average diameter of about 30–100 microns. Pure white, and colored varieties may be used in all castings, while brown varieties are those with many black spots are used only behind a coating of standard, heavyweight cultured marble. Blends of microspheres with calcium carbonate, and other solid mineral fillers are also known to function as lightweight filler materials in the field of cultured marble.

The conventional microspheres are usually made of either borosilicate glass, sodium silicate, a naturally occurring volcanic glass known as perlite, or polyvinylidenechloride (PVDC) which is either uncoated or coated with micronized solid mineral particles. Conventional microspheres typically have specific gravities ranging from 0.02–0.25. The non-white microspheres used in the cultured marble field are usually made of a ceramic material and have a specific gravity of approximately 0.7. In the field of cultured marble, microspheres are used in the range of 20–70% by volume of the heavyweight calcium carbonate filler.

As has been discovered, use of any of the known microspheres in the field of cultured onyx has failed due to an unacceptably high opacity.

In accordance with the principles of the present invention, a solid particle filler is used in the field of cultured onyx to achieve weight reduction and thermal cycling improvement, while maintaining translucency of the finished product sufficient to maintain its status as a cultured onyx product. The typical specific gravity of the solid particle filler material of the present invention ranges from 0.9–0.95. Furthermore, it is believed that the solid nature of the filler particles used in the present invention eliminates the problem caused by reflection and refraction at multiple interfaces associated with use of microspheres. Furthermore, the specific materials used as filler materials within the present invention have indices of refraction which match well with the resin and the ATH components as well.

Furthermore, as is well known, in solid surface applications, the use of microspheres increases the porosity of the castings, which thereby decreases the stain resistance. Many microspheres, such as Silbrico's Sil-Cel grade and DICAPERL'S HP series are not capable of withstanding the vacuum mixing required and most of these will also result in a decrease in strength of the finished cast product.

In accordance with the above-stated objects and summary of the invention, the preferred and best mode of practicing the invention will be described. With reference to a standard, heavyweight cultured onyx product and its method of manufacture. Standard, heavyweight cultured onyx utilizes an average of one part by weight polyester resin to two parts by weight of ATH. Within the field of cultured onyx, a range of ingredient ratios may be used to make cultured onyx and solid surface products. In accordance with the principles of the present invention, a shredded, clear thermoplastic resin is used in combination with the standard ATH filler to produce a translucent, reduced weight cultured onyx product. In accordance with the present invention, a mixture of the thermoplastic resin material with standard ATH for use in subsequent manufacturing of cast, cultured stone products is envisioned.

Products made using the present invention achieve translucency, improve thermal cycling and reduced weight in a cast, thermoset resin system through use of the shredded, clear thermoplastic resin in combination with the ATH.

Shredded thermoplastic material s useful in the present invention are those commonly used for rotationally molded parts, such as trash cans. When mixed with resin and catalyst, and then molded, finished products such as sinks, have structural integrity which meets the standard set forth in ANSI 124.6 for gel coated products, such as cultured onyx, or the International Cast Polymers Association's ICPA-SS-1-1977 Performance Standard For Solid Surface Materials.

The thermoplastics which are useful in the present invention are also inert in water. Accordingly, components made with this material will not swell, crack, be contaminated by, and will not contaminate water which in turn contacts them.

Within the principles of the present invention, useful thermoplastics are polyolefins, preferably polyethylene (PE) and polypropylene (PP). It is also envisioned that other polyolefins such as polymethylpentene and others having equivalent physical and optical properties may be used.

It is preferred that the polyolefin filler material be a shredded PE or PP, and that it not be used as the sole filler. Rather, it is preferred that the shredded PE or PP be used as a partial substitute for the ATH component. As is well known, the ATH component provides some degree of fire/smoke retardants, and some degree of retention of this property is preferred. Furthermore, ATH provides particle packing sufficient to maintain a smooth, uniform appearance for the finished cultured onyx or solid surface finished product. For all of these reasons, it is preferred that the ATH be retained as a portion of the mixture used for the cultured stone product of the present invention.

The present invention includes, as a component used in the manufacture of a cultured stone product, a white, powdery mixture which includes $Al_2O_3 \cdot 3H_2O$ in the range of 20 parts by volume to 90 parts by volume and a polyolefin in the range of 10 parts to 80 parts by volume as being a useful mixture within the principles of the present invention.

More specifically, the preferred range of ingredients in the white, powdery mixture includes $Al_2O_3 \cdot 3H_2O$ in the range of about 30 parts by volume to 60 parts by volume and a polyolefin in the range of 40 parts by volume to 70 parts by volume.

With respect to the polyolefin used in the present invention, preferred polyolefins are those selected from the various grades of polyethylene such as LLPE, HDPE and Super Linear PE and polypropylene.

The most preferred white, powdery mixture used within the scope of the present invention includes 50 parts by volume $Al_2O_3 \cdot 3H_2O$ and an LLPE and/or HDPE polyethylene in approximately 50 parts by volume.

Cultured stone products are made using a mixture as defined above, together with a clear, thermosetting resin, in the range of 40–70% by volume, a catalyst suitable for maintaining clarity and colorlessness in the finished casting, and in a range of about 0.1 to about 5.0% by volume, and, if desired, a pigment.

The process of manufacturing a cultured stone product includes blending a mixture of $Al_2O_3 \cdot 3H_2O$ and polyolefin, as described above, in the range of about 30–60% by volume with a clear thermosetting resin, in the range of about 40–70% by volume, the catalyst, in a range of 0.1 to about 5.0% by volume, and the pigment, if desired, placing the mix into a suitable mold and then removing the mold when hardened.

Clear, thermosetting resins useful within the present invention are unsaturated polyesters, acrylic-modified polyesters and acrylics. These resins are used in the ratio of about 40–70% by volume. Also, the thermosetting resins are used in conjunction with the suitable catalyst, preferably a peroxide.

A preferred method of making cultured onyx or solid surface products within the scope of the present invention include use of a mixture of $Al_2O_3 \cdot 3H_2O$ and polyolefin in the range of 40–50% by volume with the clear, thermosetting resin in approximately 50–60% by volume, the catalyst in approximately 0.1 to 5.0% by volume and, if desired, a pigment, and mixing as described above. The preferred process of manufacture and preferred product is a cultured onyx product made with a white, powdery mixture containing about 50 parts by volume $Al_2O_3 \cdot 3H_2O$ and about 50 parts by volume LLTE or HDPE polypropylene, the mixture being approximately 47% by volume, with a clear, thermosetting unsaturated polyester, acrylic modified polyester or acrylic resin at about 52% by volume, a peroxide catalyst at about 1% by volume, and, if desired a pigment. This mixture is placed into a suitable mold, allowed to polymerize and removed when hardened.

In accordance with the present invention, three examples are described below to illustrate components made using the principles of the present invention.

EXAMPLE 1

One part of Ashland cultured onyx resin was mixed with 1⅓ parts by weight of a filler consisting of a 1:1 volume blend of white ATH and PE (Alcoa OC-2000 and Exxon Escorene LL 8556.24; 36.5 and 14 parts by weight respectively). This mixture was catalyzed with one part per hundred resin (phr) MEKP in a sink mold, with the resulting product being a cultured onyx sink. The resulting cultured onyx sink was 20% lighter than a standard, cultured onyx sink. Also, the lightweight, cultured onyx sink made in accordance with Example 1 was thermally cycled at 170° F. hot/45° F. cold. The Example 1 sink survived 3,100 cycles as compared to the typical 500–1,000 cycles for a conventional, cultured onyx sink.

EXAMPLE 2

A solid surface block was made in accordance with the principles of the present invention. Alcoa OC-2000 ATH, polyester resin and MEKP were used in combination at equal parts by weight of filler and resin. The resin used was an HDPE grade, specifically Exxon Escorene HD8761 on the basis of resin demand, stain resistance, transparency and heat resistance. The finished product block demonstrated a 20% reduction in weight was achieved. It is believed that the Example 2 block also has an increased thermal cycle capability.

EXAMPLE 3

A cultured onyx block was made using an equal weight blend of ATH and Exxon Escorene LL 8556.24 was cast into a cultured onyx block using MEKP catalyst. The finished cultured onyx block made with the components of Example 3 exhibited a 7% weight reduction compared to an identically-sized cultured onyx block made with the components of Example 1. Although the Example 3 cultured onyx product exhibits an even greater reduction in weight, this particular formulation is not at present preferred due to the higher perceived cost per pound of filler material.

As may be seen above, useful ranges of the use of polyolefin in this invention are between 20 and 70% by volume of the ATH used in the casting. The preferred range is between 40 and 60% by volume of ATH, and in the best mode, approximately 50% by volume, of the ATH component is replaced with a polyolefin.

Furthermore, with respect to the mixtures used to make finished cultured onyx or solid surface products, the ranges of components found to be useful include use of a resin in the amount of 40–70% by volume. The preferred amount of resin is about 50–60% by volume, and in the best mode, approximately 52% by volume of resin is used for cultured onyx, and about 60% by volume is used in solid surface applications.

In addition to matching refractive indices, polyolefins have good chemical resistance, relatively low flammability, and are useful in the temperature ranges encountered in common bathroom and kitchen applications. As stated above, the HDPE grade selected for solid surface applications has a higher heat resistance, because kitchen applications are more likely to encounter boiling water. LLPE can be used in bathroom applications, where temperatures are more likely to be below 140° F. Shredded polyolefins also are an economical product, readily available due to their wide use for rotational thermoplastic molding applications.

It will be understood that certain features and subcombinations are of utility and may be employed without reference to other features and subcombinations as they are outlined within the description above and within the claims appended hereto. While the preferred embodiments and application of the invention have been described, it is apparent to those skilled in the art that the objects and features of the present invention are only limited as set forth in the claims appended hereto.

I claim:

1. A process of making relatively lightweight, translucent cultured stone products comprising:

Selecting a white, powdery mixture comprising $Al_2O_3 \cdot 3H_2O$ in the range of 20 parts by volume to about 90 parts by volume, and a polyolefin in the range of 10 parts by volume to 80 parts by volume;

Selecting a clear thermosetting resin, in the range of 40 to 70 percent by volume;

Selecting a catalyst suitable for maintaining clarity in a finished casting, the catalyst in the range of 0.1 to 5.0 percent by volume;

Mixing said powdery mixture, said resin and said catalyst to form a cultured stone mix;

Placing the cultured stone mix into a mold; and

Curing the mix to yield a relatively light weight, translucent cultured stone product.

2. The process of claim 1 further including the step of adding pigment to the cultured stone mix prior to placing the mix into the mold and in an amount sufficient to maintain the relatively lightweight, translucent cultured stone products as cultured onyx products.

3. The process of claim 1 further including the step of removing the cultured stone mix after curing said mix.

4. The process of claim 1 wherein the clear thermosetting resin is selected from the group consisting essentially of unsaturated polyesters, acrylic-modified polyesters and acrylics.

5. The process of claim 1 wherein the catalyst includes a peroxide.

6. The process of claim 1 wherein:

The white, powdery mixture includes $Al_2O_3 \cdot 3H_2O$ in about 50 parts by volume and a polyethylene selected from the group consisting essentially of LLPE or HDPE at approximately 50 parts by volume;

The clear thermosetting resin is selected from the group of unsaturated polyesters, acrylic-modified polyesters and acrylics at approximately 52 volume percent; the catalyst is a peroxide at approximately one percent (1%) by volume.

7. A process of making relatively lightweight, translucent cultured stone products comprising:

selecting a white, powdery mixture comprising $Al_2O_3 \cdot 3H_2O$ in the range of 30 parts by volume to 60 parts by volume, and a polyolefin in the range of 40 parts by volume to 70 parts by volume;

selecting a clear thermosetting resin, in the range of 30 to 60 percent by volume;

selecting a catalyst suitable for maintaining clarity in a finished casting, the catalyst in the range of 0.1 to 5.0 percent by volume;

blending said powdery mixture, said resin and said catalyst to form a cultured stone mix;

placing the cultured stone mix into a mold; and curing the mix to yield a relatively light weight, translucent cultured stone product.

8. The process of claim 7 further including:

polymerizing said resin after blending said powdery mixture, said resin and said catalyst.

9. The process of claim 7 further including the step of adding pigment to the cultured stone mix prior to placing the mix into a mold.

10. The process of claim 7 wherein:

said white powdery mixture comprises $Al_2O_3 \cdot 3H_2O$ and polyolefin in equal parts by volume.

11. The process of claim 7 wherein:

said white powdery mixture is in the range of 40 to 70 percent by volume and said resin is in the range of 30 to 60 percent by volume.

12. The process of claim 7 wherein:

said white powdery mixture is in the range of 40 to 50 percent by volume and said resin is in the range of 50 to 60 percent by volume.

13. The process of claim 7 wherein:

said white powdery mixture comprises about 50 parts by volume $Al_2O_3 \cdot 3H_2O$ and about 50 parts by volume LLPE, HDPE or polypropylene.

14. The process of claim 13 wherein:

said white powdery mixture is about 47 percent by volume and said resin is about 52 percent by volume.

15. The process of claim 13 wherein:

said catalyst is a peroxide catalyst at about 1 percent by volume.

16. The process of claim 7 wherein:

said white powdery mixture is about 47 percent by volume and said resin is about 52 percent by volume.

17. The process of claim 7 wherein:

said catalyst is a peroxide catalyst at about 1 percent by volume.

18. The process of claim 7 wherein:

said white powdery mixture is about 47 percent by volume and said resin is about 52 percent by volume.

19. The process of claim 7 wherein:

said catalyst is a peroxide catalyst at about 1 percent by volume.

20. The process of claim 7 wherein the polyolefin has a specific gravity in the range of 0.9 to 0.95.

21. A process of making a relatively lightweight, translucent cultured stone product comprising:

selecting a white, powdery mixture comprising about equal parts $Al_2O_3 \cdot 3H_2O$ and equal parts of LLPE, HDPE or polypropylene;

selecting a clear thermosetting unsaturated polyester, acrylic modified polyester or acrylic resin;

selecting a peroxide catalyst;

blending said powdery mixture at about 47 percent by volume with about 52 percent by volume resin with about 1 percent by volume catalyst to form a cultured stone mixture;

polymerizing said cultured stone mixture to form the cultured stone product to yield a relatively light weight, translucent cultured stone product.

* * * * *